March 5, 1968 J. O. KING, JR 3,371,572
LOCKING BOLT AND LOCKING MEANS THEREFOR
Filed Nov. 1, 1965 6 Sheets-Sheet 1

INVENTOR
John O. King Jr.

BY Newton, Hopkins, Jones & Ormsby

ATTORNEYS

March 5, 1968 J. O. KING, JR 3,371,572
LOCKING BOLT AND LOCKING MEANS THEREFOR
Filed Nov. 1, 1965 6 Sheets-Sheet 2

INVENTOR
John O. King, Jr.
BY Newton, Hopkins, Jones & Ormsby
ATTORNEYS

March 5, 1968 J. O. KING, JR 3,371,572
LOCKING BOLT AND LOCKING MEANS THEREFOR
Filed Nov. 1, 1965 6 Sheets-Sheet 3

INVENTOR
John O. King, Jr.

BY Newton, Hopkins,
Jones & Ormsby

ATTORNEYS

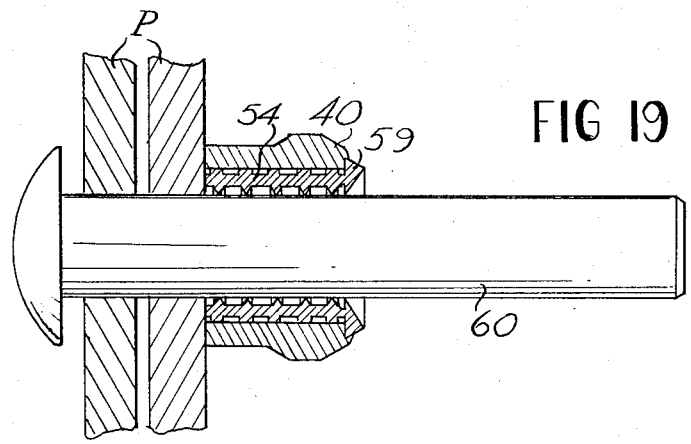
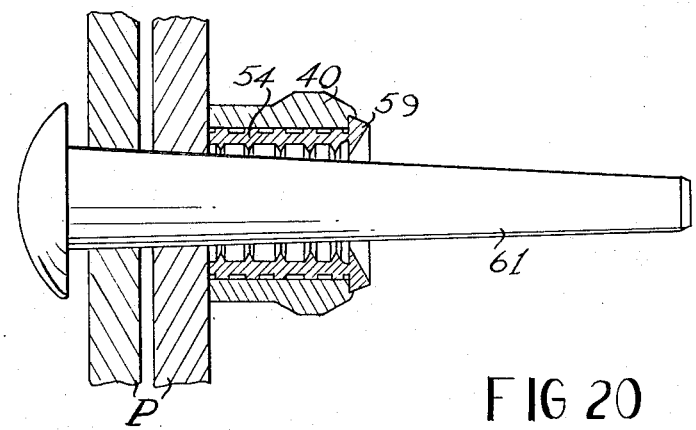

United States Patent Office 3,371,572
Patented Mar. 5, 1968

3,371,572
LOCKING BOLT AND LOCKING
MEANS THEREFOR
John O. King, Jr., 110 Lake Forrest Lane,
Atlanta, Ga. 30305
Filed Nov. 1, 1965, Ser. No. 505,825
10 Claims. (Cl. 85—7)

ABSTRACT OF THE DISCLOSURE

A fastener for attaching material together having aligned openings therethrough comprising a locking bolt having a head, shank portion, and a swageable collar receivable around the shank portion and effective to be swaged around the locking bolt by a swaging tool which forces the collar toward the head of the locking bolt; and further includes a scoring means being retained by the collar adjacent that end of the collar engaged by the swaging tool. The scoring means may be separate or may be an integral part of the insert placed inside of the collar. The scoring means is removed from the collar by forcing the material of the collar retaining the scoring means away from the scoring means to force the scoring means from the collar as an incident of the swaging operation and, if the scoring means is an integral part of the insert, the scoring means is also sheared from the insert as it is removed from the collar as an incident of the swaging operation.

---

This invention relates to locking bolts wherein a ductile collar is swaged onto a bolt to lock the bolt in place, and is more particularly concerned with means to be used in conjunction with a ductile collar effective to selectively determine the point of separation between the installed portion of the bolt and the excess protruding shank beyond the collar as an incident to the swaging operation and to be removed from the collar as an incident of the swaging operation. The invention is also particularly concerned with knurl means for releasing sealant around the locking bolt.

In the past, many varieties of swaged collar locking-type bolts have been made, the most common of which includes a plurality of circumferential grooves, commonly known as locking grooves, into which the material of a collar flows as the collar is swaged. In such locking bolts, there is generally a grooved portion having a diameter substantially less than that of any other portion of the bolt itself. This groove is commonly known as a breakneck groove, and determines the point at which the unused portion of the bolt, or pin tail which protrudes beyond the collar, will be separated from the installed portion of the bolt when the tension on the bolt exceeds a predetermined amount during the conventional swaging process.

There are several disadvantages to these conventional locking bolts, these disadvantages including the effort and expense in forming the locking grooves for locking the collar to the bolt, and the fact that the breakneck groove must be formed at one place on any particular bolt. Since any particular bolt can be broken at only one place along its length, the most efficient use of any given length of the bolt is limited relatively to a small range of thicknesses to a particular thickness of material to be fastened. Accordingly, many different lengths of bolts must be inventoried by a shop in order to insure availability of the correct length of bolt for any particular job.

In addition to the most common type of locking bolt as described above, the prior art shows a locking bolt which has no shank grooves or discontinuities whatever and on which the collar is locked by hardened internal teeth in the collar with the pintail being cut off by the last tooth in the collar. This configuration requires a non-hardened bolt so that the collar can grip any portion of the relatively soft shank and force the collar to cut off the pintail at the aforementioned last tooth. Such a configuration does avoid the problem of matching bolt length to material thickness and eliminates the excess protrusion of shank from the collar, however, it does not permit use of high strength materials in the bolt as is required by certain aerospace and commercial applications. Additionally, other prior art locking bolts show a continuously grooved bolt from head to end to achieve locking of the collar to the bolt at any place along its length. Such bolts are unacceptable for high strength or low joint deflection applications because the grooves in the shank within the joint will damage the inner surface of the hole in the work pieces when the work pieces are subjected to shear loading.

The concept of this invention provides for cutting and gripping a hardened shank locking bolt by an ultra-hard cutting ring used in the collar or by selectively annealing a length of a hardened knurled portion of the shank portion to facilitate cut-off of the excess shank portion during swaging. The use of a knurled section on the shank portion promotes cutting of the hardened shank portion by a hardened, substantially continuous ring. Additionally, the cut-off occurs so no excess shank portion will protrude from the collar and substantial reduction in the inventory of different lengths of locking bolts required may be achieved. The knurled portion also facilitates flow of sealant material so it will not prevent proper locking of the collar on the bolt.

The hardened cutting element is removed or sheared from the completed collar assembly as an incident to the swaging operation. This concept serves to substantially reduce the finished or assembled weight of the installed fastener. As previously noted, knurling provides a means for gripping the shank portion without the necessity of having circumferential locking grooves around the shank portion to lock the collar thereon. Such gripping may be provided by knurling that portion of the shank portion to be gripped by the collar or knurling the inside of a contractible hardened sleeve insert carried by the collar.

When a sleeve insert is used to accomplish gripping in lieu of a knurl on the shank portion or the internal portion of the collar, the hardened sleeve insert contains a non-axially extending slit. The insert grips the bolt better by providing an angularly-extending, pinched portion on the bolt so as to assist in preventing the swaged collar from slipping off the bolt. The pinched portion also prevents rotation of the collar on the bolt shank.

The means for notching the bolt to allow separation of the unused portion of the bolt called the pintail, from the used portion of the bolt as it is installed comprises a collar which carries a scoring means for notching the bolt sufficiently during the swaging of the collar on the bolt to permit the unused portion of the bolt to be broken off easily. It can be seen that the point along the length of the bolt at which the bolt fails is determined by the position of the scoring means along the length of the bolt. The length of the unused portion of the bolt, then, is dependent on the thickness of the pieces of material to be fastened. It will also be noted that the scoring means is removed from the collar as an incident to the swaging operation.

These and other features and advantages of the present invention will become more apparent upon consideration of the following specification taken in conjunction with the accompanying drawings wherein like characters of reference designate corresponding parts throughout and in which:

FIG. 19 is a cross-sectional view showing the collar assembly of FIG. 9 installed on a plain shank locking bolt, and FIG. 20 is a cross-sectional view showing a collar assembly being installed on a tapered locking bolt.

These figures and the following detailed description disclose several specific embodiments of the invention; however, it is to be understood that the inventive concept is not limited to the details disclosed herein since the invention may be embodied in other equivalent forms.

Figure 1:
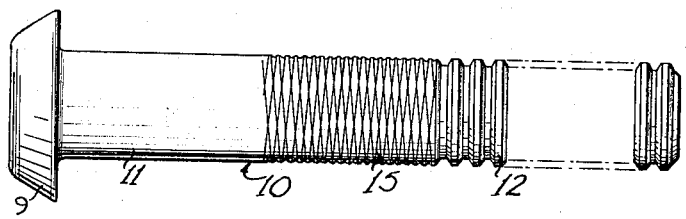
FIG. 1 is a side elevational view of one form of locking bolt made in accordance with the teachings of the invention.

FIGS. 1 to 4 of the enclosed drawings disclose specific embodiments of lockbolts that may be used with the present inventive concept. FIG. 1 shows a locking bolt 10 having a head 9, a hardened shank 11 extending from the head 9, and a hardened pintail 12 which has conventional pull grooves therearound integral with the extending end of the shank 11. A portion of the shank 11 adjacent the pintail 12 may be annealed so that the shank portion may be more readily notched with a scoring means, however, it may be seen that this annealed section will be notched by the scoring means even though the shank 11 and pintail 12 of the locking bolt 10 as shown in FIG. 1 is hardened.

The surface of the shank 11 adjacent the pintail 12 is knurled as at 15 to increase the holding power of the bolt 10 when installed as will be explained hereinafter. It will be noted that the helical or lead angle of the knurl 15 is small and that the knurl 15 is a double knurl. The diamond shape formed by the knurl 15, then preferably, has its longer dimension oriented circumferentially of the bolt 10. The reason for this particular kind of knurl is that a force acting on the knurl 15 will be longitudinally of the bolt; therefore, the knurl grooves will be substantially perpendicular to the direction of force to provide greater resistance against movement of the swaged collar along the knurl 15.

Figure 2:
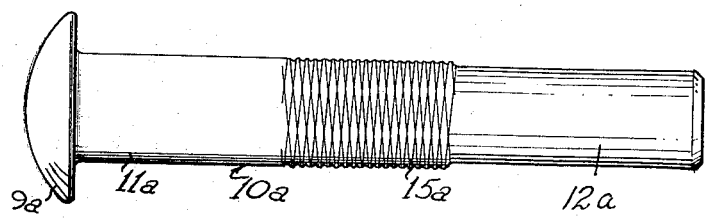
FIG. 2 is a modified form of locking bolt according to the invention.

FIG. 2 discloses a locking bolt 10a having a head 9a and shank 11a. That portion of the surface of the shank 11a in the area where the collar is to be locked onto the bolt 10a is knurled as at 15a. The portion 12a, which is subjected to pull from the gripper type jaws of the swaging tool as shown in FIGS. 16B through 16E is to be softer than the tool jaws in order that they may be properly indented and grip the portion 12a. The portion of the knurl 15a where the bolt 10a is to be fractured may be hardened like the head 9a and shank 11a or may be soft like the pintail 12 of the locking bolt 10 shown in FIG. 1 depending upon the ability of the collar notching element, as described hereinafter, to create a fractureable notch so that tension loads built up by the swaging tool after the swaging of the collar will create failure in the bolt at the notch and thus separate the pintail portion from the installed bolt.

Figure 3:
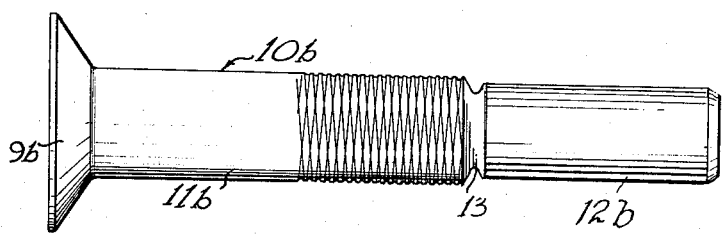
FIG. 3 is a third form of locking bolt according to the invention.

FIG. 3 discloses a locking bolt 10b having a head 9b, a shank 11b, and a pintail 12b. The pintail 12b is connected to the shank 11b through a breakneck groove 13 of conventional type which is effective to cause the bolt 10a to fail thereat to terminate the swaging operation. The bolt 10b is knurled at that portion of the shank 11b adjacent the groove 13 as indicated at 15b. This knurling is done in the same manner as that on the locking bolt 10. Preferably the pintail 12b will be annealed so that the gripper jaws of the swaging tool may properly engage the pintail 12b to fracture the bolt 10b at notch 13.

It will be noted that the bolts 10, 10a and 10b do not have the conventional locking grooves in the shank portions thereof since they will not be needed with the present inventive concept. This will be explained in more detail hereinafter.

Figure 4:
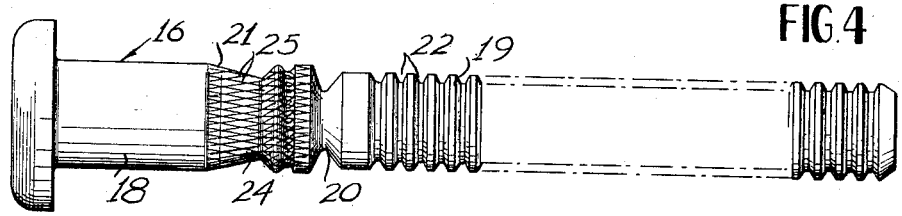
FIG. 4 is a fourth form of locking bolt made in accordance with the invention.

FIG. 4 discloses a locking bolt 16 having a shank portion 18 and a pintail 19 connected in conventional manner through a breakneck groove 20. A conventional locking groove 21 is provided on the shank portion 18 adjacent the breakneck groove 20 and a plurality of conventional pull grooves 22 are defined by the pintail 19. The surface of the locking groove 21 and that surface of the shank portion 18 between the locking groove 21 and the breakneck groove 20 are knurled as at 24 with a knurl having a large lead angle so that diamond shapes formed by the knurl 24 have their major axes parallel to the longitudinal centerline of the locking bolt 16. Sealing compound (not shown) used in sealing locking bolt joints will be able to flow out of the joint along grooves 25 of the knurl 24 as a conventional collar is swaged thereon.

Figure 10:
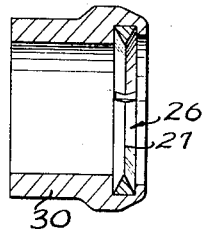
FIG. 10 is a diametrical cross-sectional view of a collar having a cutting or scoring ring mounted therein according to the invention.
Figure 11:
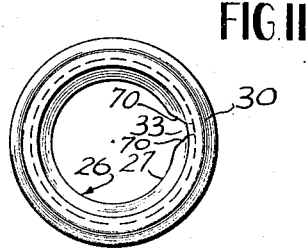
FIG. 11 is an end elevational view of the collar and cutting ring shown in FIG. 10.
Figure 12:
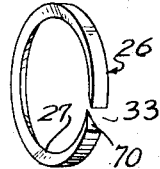
FIG. 12 is a perspective view of the cutting or scoring ring shown in FIGS. 10 and 11.

Since the breakage point of a locking bolt is preferably smooth and the breakage point is to be selectively located axially along the shank of locking bolts such as those disclosed in FIGS. 1 and 2, a contractible cutting or scoring ring 26 is carried by a swageable collar 30, such as that shown in FIG. 10, which is used in the invention. The ring 26 is of hardened metal so that it will cut into and notch the bolts 10 in an annealed or unhardened section or in the hardened section when very hard cutting rings 26 are used. The ring 26 should have a beveled edge 70 where it is split so that the load required to contract the rings 26 will be kept at a minimum.

This notched section or breakneck groove formed by the ring 26 serves to reduce the strength of the bolt at the notched section so that the bolt fails at the notched section after the swaging operation. Therefore, it will be seen that the ring 26 serves to form a notched breakneck groove as an incident of the swaging operation. The important distinction here is that the notched breakneck groove 28 as seen in FIGS. 16b, 16c, 16e, 16f, 17 and 18, is formed as the collar 30 is swaged so that the thickness of the material being joined is compensated for as seen in FIGS. 16C and 16D.

The ring 26 has a sharp inner cutting edge 27 for cutting into a locking bolt and is split as at 33 so that the effective diameter of the ring 26 may be reduced by use of relatively small forces during the swaging of the collar 30. The outer peripheral edge of the ring 26 is flat to fit in the swageable collar 30 as shown in FIG. 10 so that the ring 26 is inherently contracted as the collar 30 is swaged onto a locking bolt.

Figure 13:
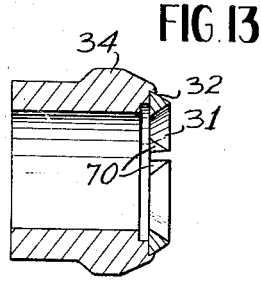
FIG. 13 is a cross-sectional view of a collar similar to that of FIG. 10 showing another means of mounting the cutting or scoring ring in the collar.
Figure 14:
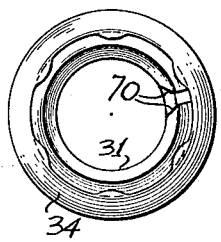
FIG. 14 is an end elevational view of the collar shown in FIG. 13.
Figure 15:
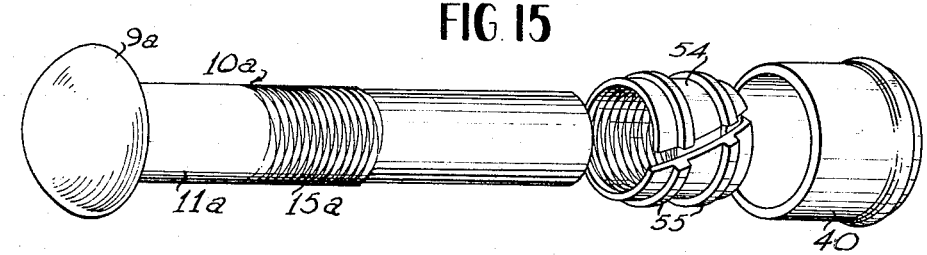
FIG. 15 is an exploded view showing a locking bolt, locking sleeve insert and collar made in accordance with the invention.

A second embodiment of the cutting ring 26 is shown in FIGS. 13 and 14 and is designated by the numeral 31. The cutting ring 31 is identical to the ring 30 except that the outer peripheral edge 32 tapers inwardly on one side thereof. The outermost portion of the peripheral edge 32 is held by a swageable collar 34 as shown in FIGS. 13 and 14. This is effective to extend the cutting ring 31 forwardly of the collar 34 so that when the conventional swaging anvil such as that shown in FIG. 16B swages the collar 34 onto the locking bolt such as that shown in FIGS. 1 and 2, the anvil physically contacts the tapered peripheral edge 32 and forces the ring 31 to cut into the bolt to form a notched breakneck groove. A beveled edge 70 is provided at the point where the ring 31 is split to facilitate contraction of the ring 31 to cut a locking bolt. The swaging operation also frees the ring 31 so that it falls off the bolt and collar when the pintail of the bolt is snapped off. The removal of the scoring ring 31 from the collar 34 reduces the weight of the completed assembly so that a considerable weight saving is achieved as required for use on weight critical structures such as an aircraft.

Figure 16:
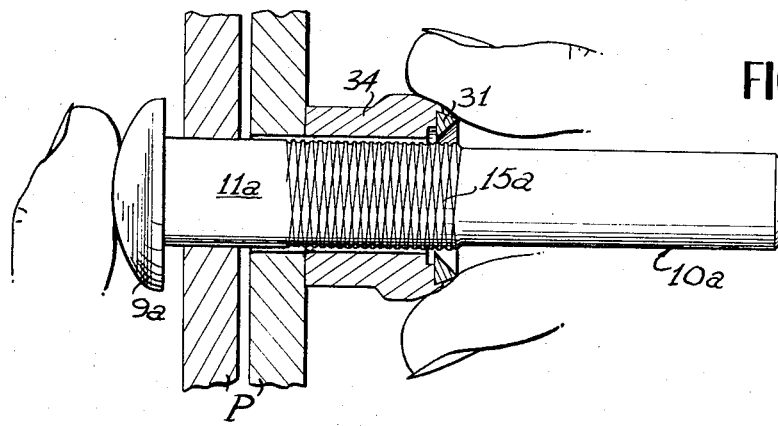
FIG. 16A is a cross-sectional view of a different configuration showing a collar assembly being installed on a bolt passed through two plates to be fastened together according to the invention.
FIG. 16B shows the swaging tool beginning to set the collar assembly around the locking bolt of FIG. 16A.
FIG. 16C shows the next step in setting the collar assembly around the locking bolt, the collar being fully swaged, and the cutting or scoring ring being forced into the locking bolt of FIG. 16A.
FIG. 16D shows the next step in which the pin tail of the locking bolt of FIG. 16A is broken away.
FIG. 16E shows the next step in which the swaging tool is urged off the collar assembly and locking bolt of FIG. 16A.
FIG. 16F shows the last step in which the swaging tool is removed from the locking bolt and collar assembly of FIG. 16A, and the cutting or scoring ring is sheared from the collar assembly.
Figure 16:
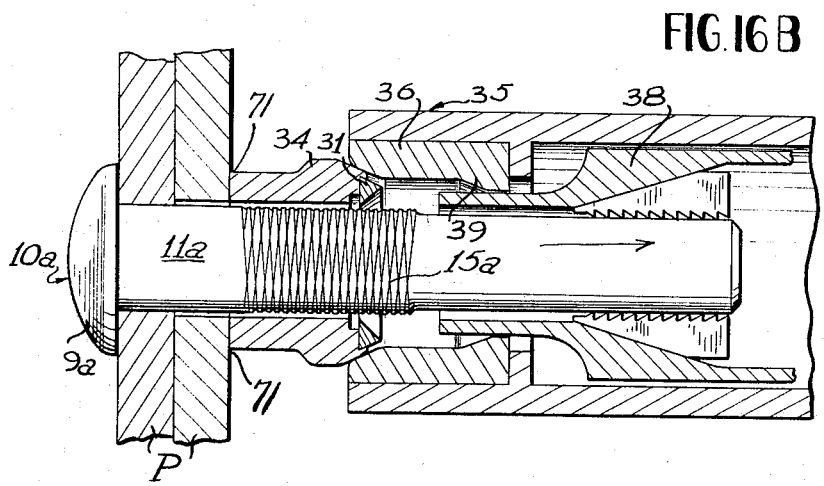
Figure 16C:
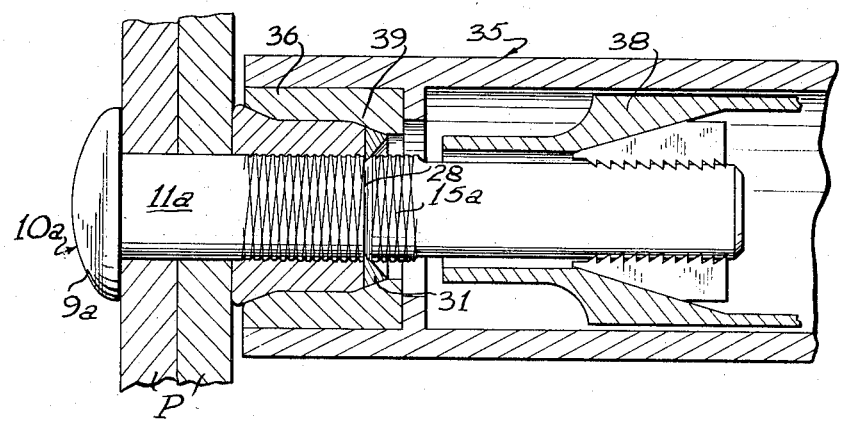
Figure 16D:
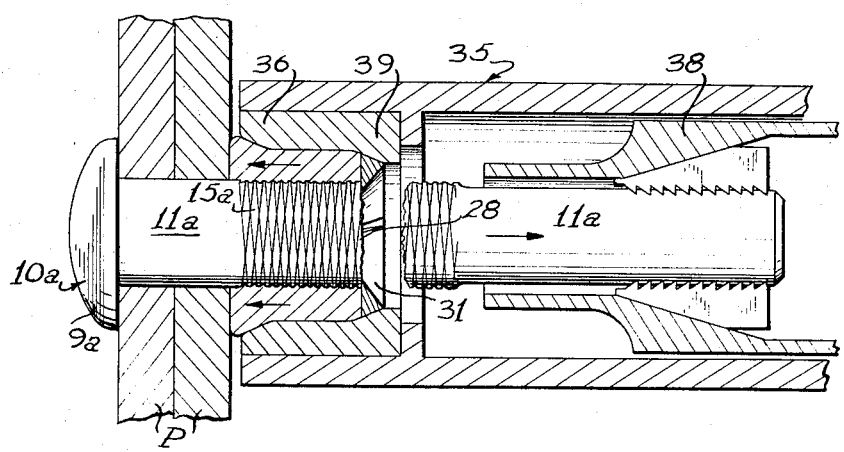
Figure 16E:
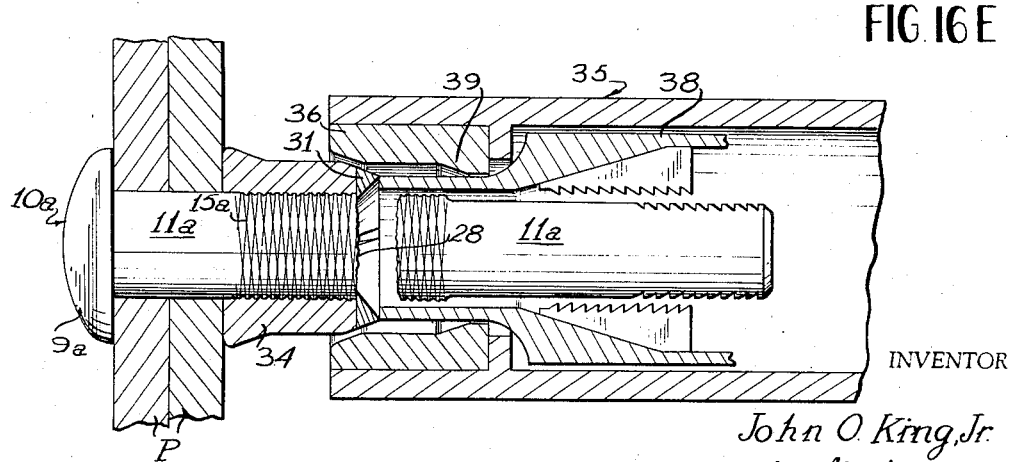
Figure 16:
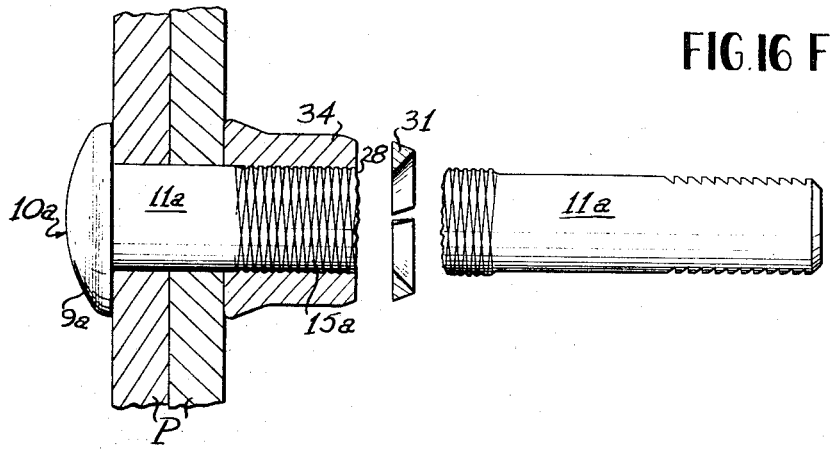

FIGS. 16A and 16F show the steps of installing the collar 34 on the locking bolt 10a so that two pieces of material are held together. The bolt 10a is first inserted through a hole in the pieces P to be fastened together and an unswaged collar 34 is placed around the extending end of the bolt 10a. Then a conventional swaging tool indicated at 35 is placed over the extending end of the bolt 10a. An anvil 36 of the swaging tool 35 engages the circumferential portion of the collar 34 in order to urge it toward the pieces P and to simultaneously contract the collar inwardly toward the knurl 15a. It will be understood that a swaging tool has a conventional gripping mechanism 38 to grip the locking bolt 10a to pull the bolt through the pieces P in the direction of the arrows in FIG. 16B, while resisting this pulling by seating the collar against the work as at 71.

As the mechanism 38 pulls the locking bolt 10a through the hole in the pieces P, the anvil 36 engages the circumferential protuberant portion of the collar 34 to provide an initial loading of the bolt since the force of the gripping mechanism 38 pulls to the right as viewed in FIG. 16B, and the anvil 36 pushes to the left as viewed in FIG. 16B.

It will thus be seen that the bolt 10a is first pulled through the pieces P to urge the two pieces together very tightly; then, the anvil 36 will begin to deform the collar 34 to urge the circumferential protuberant portion toward the pieces P. This great force will, of course, urge the material of the collar 34 inwardly so that it will flow around the bolt 10a and into the knurl 15a.

It will be seen that the rear portion of the anvil 36 has a conical inwardly-inclined portion 39. When this portion 39 of the anvil 36 engages the outermost end of the collar 34, it will be seen that the cutting ring 31 carried by the collar 34 will be urged inwardly causing it to notch the bolt 10a to form a breakneck groove.

In the final position of installation of the bolt 10a as seen in FIG. 16C, it will be seen that the collar 34 is disposed directly against the pieces P so that the mechanism 38 which pulls the bolt 10a is pulling directly against the pieces P to be fastened and the bolt 10a. Since the bolt 10a has now been notched to form a breakneck groove, the increased force exerted on the bolt 10a as the swaging tool 35 as it continues to pull will break the bolt 10a at the breakneck groove leaving a finally installed bolt with the pintail removed.

Figure 6:
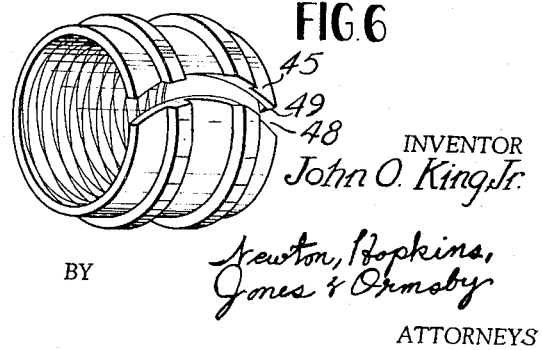
FIG. 6 is a perspective view of a modified form of sleeve insert locking means with frangible scoring means thereon made in accordance with the invention.
Figure 7:
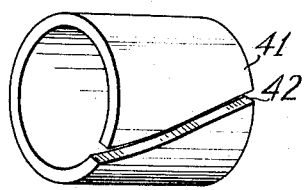
FIG. 7 is a schematic view of a sleeve insert locking means showing the helically oriented slit according to the invention.
Figure 8:
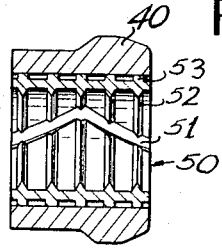
FIG. 8 is a cross-sectional view of a collar assembly showing another modified form of sleeve insert locking means with a non-axial slit therein according to the invention.
Figure 9:
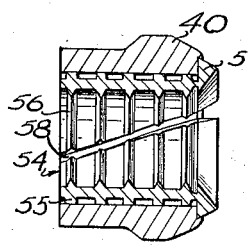
FIG. 9 is a cross-sectional view of another collar assembly having a modified form of the sleeve insert similar to that of FIG. 8 and including a cutting or scoring ring formed on the sleeve insert locking means.

In order that locking bolts such as those of FIGS. 1 and 2 be more firmly held by the collars swaged thereon, a hardened sleeve insert such as those shown in FIGS. 5 to 9 is carried by a ductile collar 40 such as that shown in FIGS. 8 and 9. The inserts are provided with contraction slits so that they are contractible to grip the locking bolt as the collar 40 is swaged around the bolt.

FIG. 7 shows a schematic sleeve insert 41 to be carried within the collar 40. The slit 42 extending along the length of the insert 41 which allows the insert to contract is positioned at an angle to the longitudinal axis of the insert 41 rather than parallel to the longitudinal axis as is conventionally done. As the sleeve insert 41 is contracted during the swaging process, the edges of the slit 42 bear against the bolt around which it is swaged so as to pinch a portion of the bolt into the slit 42. Since this pinched portion is angularly located with respect to the longitudinal centerline of the bolt, this pinched portion prevents the insert 41 from slipping off the bolt.

Figure 5:
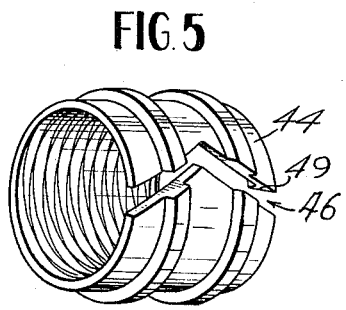
FIG. 5 is a perspective view showing one form of sleeve insert locking means with frangible scoring means thereon made in accordance with the invention.

The hardened sleeve inserts 44 and 45 shown respectively in FIGS. 5 and 6 have contraction slits 46 and 48 respectively shaped so that the sides of the inserts adjacent the slits 46 and 48 tend to align themselves rather than shift with respect to each other as they are contracted during the swaging process. A pair of circumferentially extending protuberances are provided around the exterior surface of the inserts 44 and 45 which serve to engage the ductile collar 40 as it is swaged around the locking bolt and contracts the insert 44 or 45. The inside surfaces of the inserts 44 and 45 are knurled or serrated on the inside thereof to provide a gripping surface to contact the locking bolt around which the inserts are contracted by the swaging of the collar 40 carrying the inserts.

One end of each of the inserts 44 and 45 are provided with frangible cutting or scoring ring 49 similar to the cutting ring 26, except that the ring 49 is an integral extension of the insert 44 or 45. Therefore, it will be seen that as the inserts 44 and 45 contract during the swaging operation, the ring 49 notches the bolt around which the inserts are positioned so that a breakneck groove is formed to allow the unused or pintail portion of the bolt to be broken off the used portion.

The sleeve insert 50 shown in FIG. 8 has a contraction slit 51 therein similar to the slit 46 of the insert 44 and also a series of protuberances 53 extending around the circumference thereof similar to those around the inserts 44 and 45. Alternatively to the knurl of FIGS. 5 and 6, a series of locking ridges 52 are provided around the inside of the insert 50 which serves to bite into the bolt around which the insert is placed when the insert 50 is contracted during the swaging operation. The insert is carried by the collar 40 and when the collar is swaged around the bolt, the locking ridges 52 preclude movement of the insert 50 and collar 40 with respect to the bolt.

Figure 17:
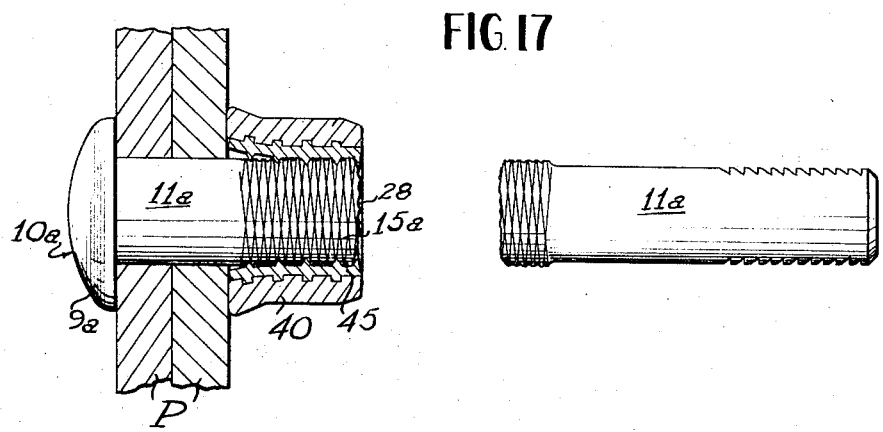
FIG. 17 is a cross-sectional view of a locking bolt and collar assembly similar to that of FIG. 16F but showing a different form of sleeve insert within the collar.
Figure 18:
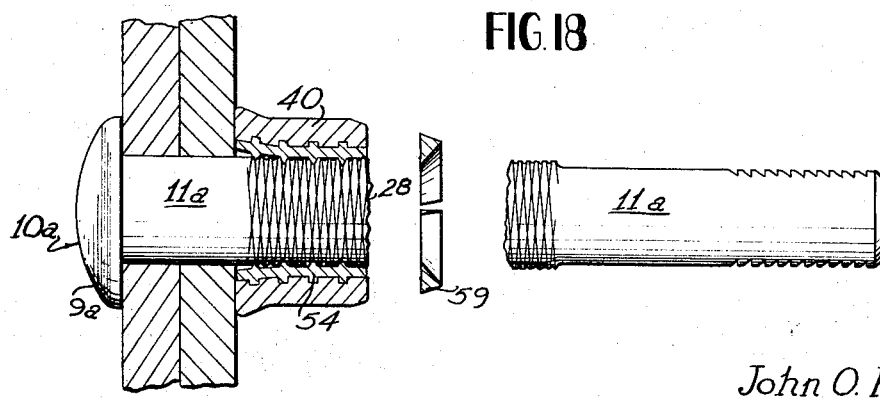
FIG. 18 is a cross-sectional view of a locking bolt and collar assembly similar to that of FIG. 17, but showing a frangible cutting or scoring ring.

The insert 54 shown in FIG. 9 is similar to the insert 50 in that the protuberances 55 are identical to the protuberances 53 and the locking ridges 56 are identical to the locking ridges 52. An angularly extending contraction slit 58 similar to that of the insert 41 is shown in FIG. 7. A frangible cutting or scoring ring 59 similar to the ring 31 is integrally carried at one end of the insert 54 so that the bolt around which the insert 54 is placed is notched as the insert 54 is contracted. This notching will be sufficient to cause the pintail to separate at the notch line. Also, it will be noted, that the swaging operation shears the ring 59 from the insert 54 so that the ring 59 drops off the swaged collar 40 when the swaging tool 35 is removed. This is best shown in FIGS. 17 and 18. It will be noted that the insert 54 may easily be used on a plain locking bolt 60 as shown in FIG. 19. It will also be noted that the rings 49 of the inserts 44 and 45 are removed as an incident of the swaging operation.

It will thus be seen that the collar assembly and bolt of the present invention provide a very efficient and inexpensive locking bolt with much greater versatility than conventional locking bolts. The knurls 15, 15a, and 15b can extend over a substantial portion of the locking bolts 10, 10a, and 10b so that the collar or insert carried by the collar can engage the knurl at the proper place for the thickness of the pieces P to be joined together; and, the bolt 10 or 10a can be notched and broken at any place along the bolt so that the bolt will always extend completely through the installed collar, but will not protrude beyond the collar.

For many bolts, the knurl such as that at 15 can be omitted since the knurl on the inside of the inserts will bite into some bolts sufficiently well to give the desired holding force. In extremely hard bolts such as shown in FIG. 1, the knurl on the bolt may be used, and the bolts may have to band annealed or locally softened in order to provide a sufficiently soft area for the cutting ring associated with the collar to notch the bolt sufficiently to form a breakneck groove at which the bolt will break.

If a knurled bolt is used with an insert such as that shown at 54, the ridges on the inside thereof will bite into the bolt deeper since there is less contact with the crests of the knurl and will result in the bolt having greater holding power. Also, the knurl provides for the egress of any fluid sealant that may be around the bolt at the time of swaging.

It will thus be seen that the present invention provides a very efficient, economical and practical locking bolt and collar assembly to be used in a great variety of applications, even those in which a tapered locking bolt 61 is used as shown in FIG. 20. Moreover, those inserts having the angularly aligned slits will tighten into the bolt more if the operator gives the swaging tool a slight twist during the swaging operation.

It will be understood by those skilled in the art that the particular embodiments here presented are by way of illustration only, and are meant to be in no way restrictive; therefore, numerous changes and modifications may be made, and the full use of equivalents resorted to, without departing from the spirit or scope of the invention as defined by the appended claims.

What is claimed as invention is:

1. In a fastener installed with a swaging tool in a swaging operation and for attaching material together including a locking bolt having an enlarged head and an elongated shank portion,
   (a) a generally cylindrical swageable collar of a deformable ductile material constructed and arranged to be slidably received around the shank portion and to be deformed and swaged around the shank portion by engagement with the swaging tool, said collar including a radially enlarged portion adjacent one end thereof;
   (b) a scoring means in the form of an annular split ring and positioned within said one end of said collar with a portion of said scoring means projecting axially therefrom, said scoring means being of harder material than said shank and including a radially inner sharpened cutting edge and an outer peripheral edge received within the material of said collar adjacent said one end, said outer peripheral edge to be engaged by the swaging tool during the swaging of said collar, whereby said cutting edge is forced into notching contact with the shank portion producing a weakened section in the shank portion which fails as an incident to the swaging operation, and said radially enlarged portion being externally bevelled away from said one end, whereby said portion is swaged from said scoring means to release said scoring means upon deformation of said enlarged portion by the swaging tool as an incident to the swaging operation.

2. In a fastener as set forth in claim 1 further including a contractible sleeve insert receivable over the shank portion and within said collar, said insert having a frangible section defining the minimum cross-sectional area of said insert connecting said insert with said scoring means and wherein said frangible section is sheared as an incident to the forcing of said scoring means into notching contact to release said scoring means for removal from said retaining means.

3. The fastener of claim 2 wherein said insert defines a longitudinal contraction slit therein, said slit being angularly located with respect to the longitudinal axis of said insert.

4. The fastener of claim 2 wherein the shank of the locking bolt includes: a knurled portion and an unknurled portion, said knurled portion being that portion of the shank extending from the material to be fastened together, and said unknurled portion being that portion of the shank which bears against the material when the material is fastened together.

5. The apparatus of claim 4 wherein said knurled portion is located only on that portion of the surface of the shank at which the collar assembly engages the shank.

6. The fastener of claim 4 wherein the locking bolt is hardened and then locally softened in the area at which the shank portion will be fractured.

7. The fastener of claim 2, said insert being knurled on the inside thereof to engage and grip said bolt when said collar assembly is swaged around said bolt.

8. The apparatus of claim 4 wherein said knurl is effective to provide for egress of sealant around said bolt.

9. The apparatus of claim 4 wherein said shank is tapered.

10. The apparatus of claim 4 wherein said shank is of the same diameter along its entire length.

References Cited

UNITED STATES PATENTS

| 642,375 | 1/1900 | Simpson | 85—37 |
| 2,030,169 | 2/1936 | Huck | 85—72 |
| 3,203,300 | 8/1965 | Marschner | 85—7 |

FOREIGN PATENTS

| 913,759 | 12/1962 | Great Britain. |

CARL W. TOMLIN, *Primary Examiner.*

R. S. BRITTS, *Assistant Examiner.*